April 15, 1930.   P. E. PULVERMAN   1,755,163
GAUGE
Filed Dec. 22, 1922
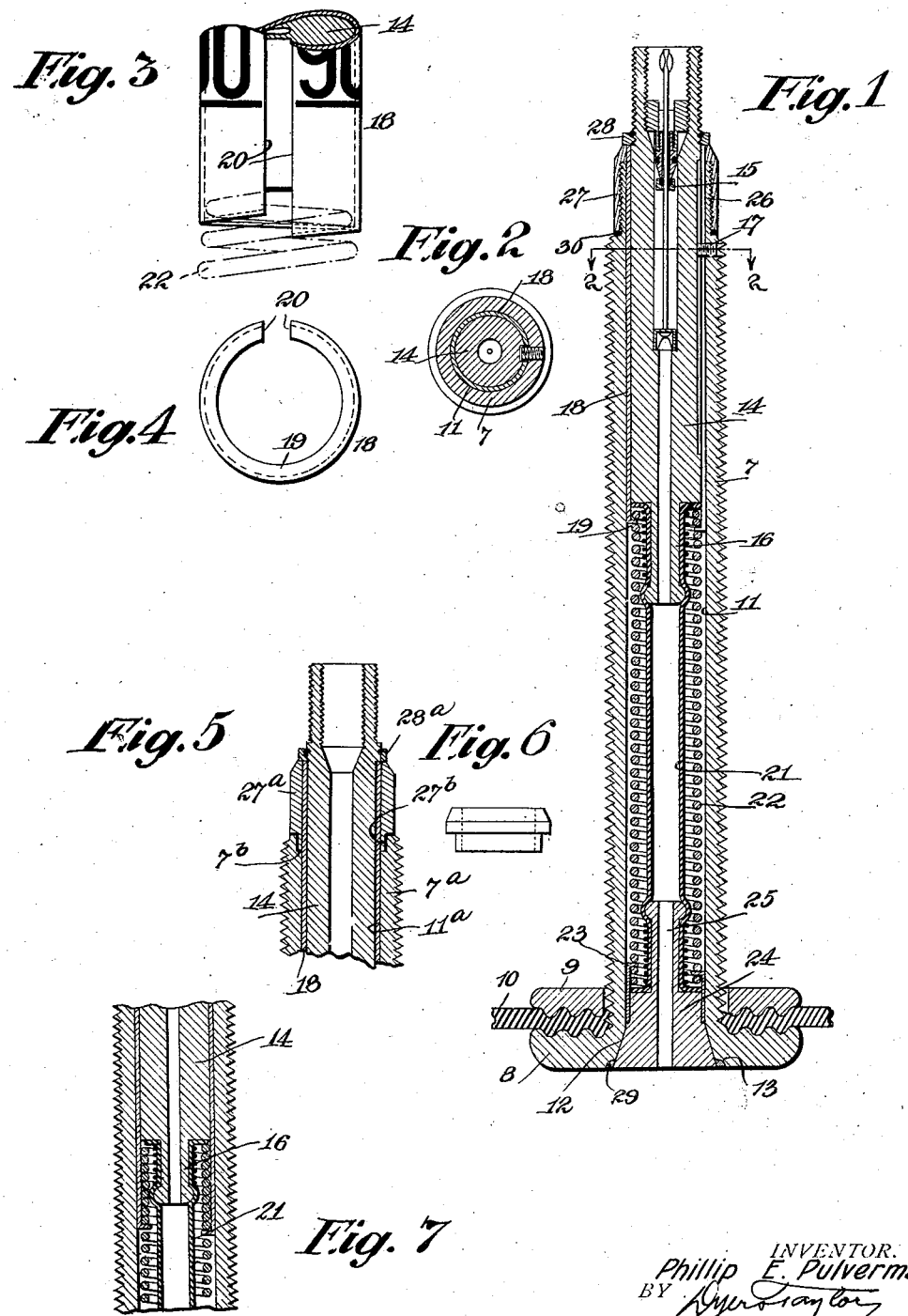

Patented Apr. 15, 1930

1,755,163

UNITED STATES PATENT OFFICE

PHILIP E. PULVERMAN, OF NEW YORK, N. Y., ASSIGNOR TO THE VISOMETER CORPORATION, OF NEW YORK, N. Y.

GAUGE

Application filed December 22, 1922. Serial No. 608,388.

The invention relates to measuring and registering gauges, and more particularly to devices for measuring and registering pneumatic pressure. The invention is illustrated and described in connection with the usual inflating and deflating valve of a pneumatic tire, but the invention is not limited to such use.

The objects of the invention are to provide a device of the character described which will indicate at all times the pressure within a receptacle, such as a tire tube; which will be cheap to manufacture; in which the parts need not be machined and fitted to form perfect joints; which will not easily get out of order; in which the operating parts may be completely assembled before being placed in operative position; in which the device may easily be tested and the tension of its weighing spring adjusted without dismantling the device, and in which wear of the number of parts will be reduced to a minimum.

These and further objects will more fully appear in the following specification and accompanying drawings, considered together or separately.

One embodiment of the invention is illustrated in the accompanying drawings, in which like parts in all of the several figures are designated by corresponding characters of reference, and in which Fig. 1 is a longitudinal section of the invention employed in conjunction with a pneumatic tire valve.

Fig. 2 is a transverse section on the line 2—2 of Fig. 1.

Fig. 3 is a detail side elevation, on an enlarged scale, of a portion of an indicator sleeve.

Fig. 4 is a bottom view of the same.

Fig. 5 is a detail sectional view illustrating a modified form of tensioning device.

Fig. 6 is a side elevation of a tension adjusting sleeve, and

Fig. 7 is a detail sectional view of a modified form of spring securing means.

In the embodiment of the invention illustrated 7 indicates the tubular body portion of a tire valve, having a flange 8 between which and a washer 9 the body is secured to a tire tube 10 whereby communication with the tire tube may be established. The bore 11 of the tube 7 is cylindrical for most of its length but at the inner end the same is counterbored to form a conical chamber 12, and a groove 13 encircles the inner edge of the counterbore.

Disposed within the bore 11 is a tubular plunger member 14 adapted to freely move longitudinally of the body. The outer end of the plunger is provided with a threaded nipple to which a dust cap may be applied, as is usual, and within the bore of the plunger is disposed a check valve 15 by means of which air may be maintained in the tire tube, and which may be unseated to inflate or to deflate the tire.

The lower end of the plunger is of reduced diameter to form a nipple 16. The plunger is provided with a longitudinal keyway into which projects a key carried by the body. In the drawings the key is in the form of a screw 17, but it is to be understood that any other form of key may be employed to prevent the rotation of the plunger in the body and prevent the removal of the plunger from the body.

The diameter of the plunger is somewhat less than that of the bore 11 of the body, and a sleeve 18 surrounds the plunger and extends beyond the inner end of the plunger proper and surrounds the nipple 16. The lower edge of the sleeve is bent inward at approximately right angles to form an inturned flange 19. The lower edge of the sleeve and the flange are of spiral form whereby the flange will form, in effect, a female screwthread of one turn.

The sleeve 18 is preferably formed of a flat sheet of thin metal having one of its edges inclined. The said inclined edge is turned up at right angles to the body of the sheet, and the sheet is rolled to form a hollow cylinder with the flange extending inwardly. The plunger is inserted in the sleeve, and preferably the parts are soldered or otherwise secured together. The length of the sheet of which the sleeve is formed is less than the circumference of the plunger whereby the edges 20 of the sleeve will not be in contact, and there will be formed a groove which will be coincident with the keyway in the plunger. If desired the keyway in the plunger may be omitted, and the key 17 may engage in the space between the edges 20 of the sleeve. The exterior surface of the sleeve 18 carries a scale or scales by means of which the pressure in the tire may be ascertained.

The nipple 16 is inserted in one end of a longitudinally expansible tube 21, preferably of rubber, in any desired manner. The end of the tube 21 lies within the chamber formed by the projecting end of the sleeve, and any bulging caused by pressure of air in the tube will be within the chamber and rubber will not come in contact with any portion of the device which is movable relatively to the plunger.

One end of a spiral spring 22 having an outside diameter slightly less than the inside diameter of the sleeve 18 is screwed into the chamber, the flange 19 acting as a thread to engage between convolutions of the spring.

The opposite end of the spring is secured to a sleeve 23, similar to the sleeve 18, and which is carried by and secured to a plug 24 seated in the inner end of the bore 11 of the body. The plug is provided with a nipple 25 to which the opposite end of the tube 21 is secured. The plug and its nipple are perforated longitudinally whereby air may pass the valve 15, through the plunger 14, tube 21 and plug 24 to the tire tube 10. That end of the plug opposite the nipple 25 is of conical form to fit within the conical recess 12, and solder is run into the groove 13 to secure the plug in place. The plug need not form a tight fit in the bore, as the solder will retain it in place.

That end of the body 7 opposite the flange 8 is reduced in diameter as shown at 26, and said reduced portion is screwthreaded as shown in Fig. 1. A screwthreaded thimble 27 is secured to the reduced portion 26 by means of the thread, and a circular nut 28 is screwed down on the dust cap nipple of the body 7 to engage the thimble and limit the inward movement of the plunger.

The device illustrated in Figs. 1, 2, 3 and 4 is assembled as follows:

The valve mechanism 15 is positioned in the plunger 14 and one end of the tube 21 is wired to the nipple 16, and the sleeve 18 is applied to the cylindrical surface of the plunger with its longitudinal edges in parallel to the edges of the keyway. The spring 22 is passed over the tube and its end is screwed into the recess formed by the projecting end of the sleeve. The sleeve 23 is screwed onto the free end of the spring and the latter is compressed to disclose the free end of the tube 21 which is then wired to the nipple 25. The sleeve 23 is now placed in position on the plug 24 and soldered or otherwise secured in position.

The apparatus thus assembled is passed into the bore of the body 7 through the counterbored end until the threaded nipple projects beyond the opposite end of the body and the end of the plug is flush with the face of the flange 8. Solder 29 is run into the groove 13 to permanently secure the plug in position.

The key 17 is placed in position in the keyway, thimble 27 is positioned over the reduced portion 26 of the body 7, and the nut 28 is screwed down over the projecting nipple of the plunger until it engages the end of the sleeve 18 and the top of the chamfered end of the thimble.

The device is now placed on a testing table with the bore of the plug 24 in communication with a source of air supply of known pressure, 60 lbs. for example, and the air passing through the tube 21 and the bore of the plunger will be prevented from escaping because of the check valve 15, and the plunger will be moved outward of the body. Should the indicator line below the numeral on the scale carried on the sleve 18 to indicate the known air pressure—in the present case 60 pounds—not register with the chamfered end of the thimble 27 the operator will know that the weighing spring 22 is either fast or slow, as the indicator line is above or below the end of the thimble. The thimble will be screwed down or up, as the case may be until the said indicator line is level with the top of the thimble. The device is now calibrated, and preferably solder 30 is run in between the lower end of the thimble and the shoulder on the body. The solder will penetrate between the threads of the thimble and the portion 26, and rigidly and permanently secure the thimble to the body.

The nut 28 may, if desired, be soldered to the plunger 14, and all parts of the device will be secured against tampering.

In the modification illustrated in Figs. 5 and 6 the outer, reduced portion of the body member 7$^a$ is dispensed with and the end of the body is counterbored as at 7$^b$. A cylindrical thimble 27$^a$, the bore of which is the same as that of the body and having an axially extending flange 27$^b$ is placed on the end of the body with the flange 27$^b$ resting in counterbore 7$^b$.

If, when the device is placed on the test table, the scale on the sleeve 18 does not indicate the known pressure, the nut is backed off and a longer or shorter thimble is substituted, and when one the upper edge of which registers with the test pressure is positioned, the same is soldered or otherwise secured to the end of the body, the nut is screwed home and if desired soldered to the plunger, and the gauge is ready for use.

In the embodiment of the invention illustrated in Fig. 5, a collar 28$^a$ may be employed instead of the nut 28. The collar may be held in position by any desired means during testing and may then be soldered or otherwise secured to the plunger.

The solder 29, in addition to securing the plug 24 in position, also seals the device to prevent the entrance of air around the plug, and all of the air entering or leaving the tire tube must pass through the tube 21.

As shown in Fig. 7, that portion of the sleeve 18 which extends downward below the body of the plunger 14, and to which the upper end of the spring 22 is secured, extends below the lower end of the nipple 16. This same construction may be applied to the plug 24 whereby the whole of the nipple 25 will lie within the boundaries of the projecting portion of the sleeve 23.

The particular advantage of this construction is that the active portion of the spring 22, that is the portion between the spiral flanges of the sleeves 18 and 23, will be shorter than the portion of the tube 21 which lies between the ends of the nipples 16 and 25, and the active portion of the spring will not contact with those portions of the tube which are extended by the lips at the outer ends of the nipples.

The operation of the device is obvious from the above description.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed and desired to be secured by Letters Patent, is—

1. A device of the character described, comprising a tubular body adapted to be secured at one end thereof to a container and to afford communication with the interior thereof, a plunger carried within the bore of the body, said plunger projecting from one end of the body, a collar on the projecting end of the plunger, and a thimble carried on the body and adapted to cooperate with the collar to limit the movement of the plunger into the tubular body.

2. A device of the character described, comprising a tubular body adapted to be secured at one end thereof to a container and to afford communication with the interior thereof, a plunger carried within the bore of the body and adapted to freely move longitudinally thereof, said plunger projecting from one end of the body, a collar on the projecting end of the plunger, a thimble having a screw threaded engagement with the body and adapted to cooperate with the collar to limit the movement of the plunger into the tubular body, and means for permanently securing the thimble to the body.

3. A device of the character described, comprising a tubular body adapted for attachment at one end to and afford communication with a container, an element within and capable of longitudinal movement relative to the body, said element projecting from the free end of the body whereby pressure within the body will move the element outwardly, a sleeve secured to and surrounding the element and projecting from the inner end of the body of the element, a spring having one end secured within the projecting portion of the sleeve, and means for securing the opposite end of the spring within the inner end of the body whereby said spring will resist outward movement of the element.

4. A device of the character described, comprising a tubular body adapted for attachment at one end to and afford communication with a container, an element within and capable of longitudinal movement relative to the body, said element projecting from the free end of the body whereby pressure within the body will move the element outwardly, a sleeve secured to and surrounding the element and projecting from the inner end of the body of the element, a spring having one end secured within the projecting portion of the sleeve, and a plug having a longitudinal perforation and engaging the bore of the body for anchoring the opposite end of the spring to the inner end of the body whereby said spring will resist outward movement of the element.

5. A device of the character described, comprising a tubular body adapted for attachment at one end to and afford communication with a container, an element within and capable of longitudinal movement relative to the body, said element projecting from the free end of the body whereby pressure within the body will move the element outwardly, a sleeve secured to and surrounding the element and projecting from the inner end of the body of the element, a spring having one end secured within the projecting portion of the sleeve, and a plug having a longitudinal perforation and engaging the bore of the body for anchoring the opposite end of the spring to the inner end of the body whereby said spring will resist outward movement of the element, said plug being permanently secured to the body.

6. A device of the character described, comprising a body having a cylindrical bore extending longitudinally therethrough, a plunger disposed within the body and adapted to move longitudinally thereof, one end of the plunger extending beyond an end of the body, a plug engaging within the opposite end of the body, means for securing the plug in position, the opposed ends of the plunger and plug being spaced apart, a sleeve surrounding the plunger and projecting from the inner end thereof, said sleeve forming part of the plunger, a spiral bead carried by the sleeve and projecting inwardly toward the axis of the bore, a spiral spring, the bead engaging between the convolutions at one end of the spring, and means for securing the opposite end of the spring to the plug.

7. A device of the character described, comprising a body having a cylindrical bore extending longitudinally therethrough, a plunger disposed within the body and adapted to move longitudinally thereof, one end of the plunger extending beyond an end of the body, a plug engaging within the opposite end of the body, means for securing the member in position, the opposed ends of the plunger and plug being spaced apart, a sleeve surrounding the plunger and projecting from the inner end thereof, said sleeve forming part of the plunger, a spiral bead projecting inwardly from the free end of the sleeve, a spiral spring, the bead engaging between the convolutions at one end of the spring, and a cylindrical tube surrounding the plug and projecting from the inner end thereof, a spiral bead projecting inwardly from the free end of the tube, said bead engaging between convolutions at the opposite end of the spring.

8. A device of the character described, comprising a tubular body adapted to be attached at one end to and afford communication with a container, an element within the bore of the body and adapted to move freely longitudinally of the body, the element being reduced in diameter at its inner end to form a projecting nipple, a sleeve fitting the major portion of the outer cylindrical surface of the element, said sleeve surrounding the element's projecting nipple and extending beyond its free end, an elastic tube connected to the nipple, and a coil spring connected to the inside of the sleeve.

9. A device of the character described, comprising a tubular body adapted to be attached at one end to and afford communication with a container, an element within the bore of the body and adapted to move freely longitudinally of the body, the element being reduced in diameter at its inner end to form a nipple, a sleeve fitting the major portion of the outer cylindrical surface of the element, said sleeve surrounding the nipple, an elastic tube engaging and secured to the exterior surface of the nipple, and a spiral spring engaging within the sleeve.

10. A device of the character described, comprising a tubular body, a plunger carried within and freely movable longitudinally of the body, said plunger extending beyond one end of the body, an elastic device within the bore of the body and attached to the plunger, said device being secured within the body at a distance from the plunger and adapted to oppose movement of the plunger in the direction away from the anchor, and means for adjusting the indicator line of the device.

11. A device of the character described, comprising a tubular body, a plunger carried within and freely movable longitudinally of the body, said plunger extending beyond one end of the body, an elastic device within the bore of the body and attached to the plunger, said device being secured within the body at a distance from the plunger and adapted to oppose movement of the plunger in the direction away from the securing means, and means accessible from the outside of the body for adjusting the indicator line of the device.

12. A device of the character described, adapted to be attached at one end to and in communication with a tire tube, comprising a tubular body, a plunger carried within and freely movable longitudinally of the body, said plunger extending beyond the opposite end of the body, a spring within the bore of the body and attached to the plunger, said spring being secured within the body in proximity to the point of attachment and adapted to oppose movement of the plunger in the direction away from the securing means, and means carried by the unattached end of the body and cooperating with means carried by the plunger to limit the inward movement of the plunger, said means carried by the unattached end also serving to adjust the indicator line of the device.

13. In an instrument of the character described comprising a plunger and a casing, adjustable means mounted on the plunger, and adjustable means mounted on the casing, said means being adapted to cooperate to limit the inward movement of the plunger within the casing, the adjustable means provided in the casing also serving to adjust the indicator line of the device.

14. In an instrument of the character described comprising a plunger and a casing, a nut carried by said plunger and a thimble carried by said casing, whereby the two cooperate to limit the inward movement of the plunger within the casing said thimble also serving to adjust the indicator line of the device.

15. In an instrument of the character described comprising a plunger and a casing, an adjustable nut carried by said plunger and an adjustable thimble carried by said casing, whereby the two cooperate to limit the inward movement of the plunger within the casing said thimble also serving to adjust the indicator line of the device.

This specification signed and witnessed this 20th day of December, 1922.

PHILIP E. PULVERMAN.